(12) United States Patent
Santini (10) Patent No.: US 9,488,102 B2
(45) Date of Patent: Nov. 8, 2016

(54) GAS TURBINES IN MECHANICAL DRIVE APPLICATIONS AND OPERATING METHODS

(71) Applicant: Nuovo Pignone Srl, Florence (IT)

(72) Inventor: Marco Santini, Florence (IT)

(73) Assignee: Nuovo Pignone Srl, Florence (IT)

( * ) Notice: Subject to any disclaimer, the term of this patent is extended or adjusted under 35 U.S.C. 154(b) by 0 days.

(21) Appl. No.: 14/655,195

(22) PCT Filed: Dec. 18, 2013

(86) PCT No.: PCT/EP2013/077261
§ 371 (c)(1),
(2) Date: Jun. 24, 2015

(87) PCT Pub. No.: WO2014/102127
PCT Pub. Date: Jul. 3, 2014

(65) Prior Publication Data
US 2015/0345385 A1  Dec. 3, 2015

(30) Foreign Application Priority Data

Dec. 24, 2012  (IT) ................ FI2012A0292

(51) Int. Cl.
*F02C 3/00* (2006.01)
*F02C 6/00* (2006.01)
(Continued)

(52) U.S. Cl.
CPC ............... *F02C 6/00* (2013.01); *F01D 15/10* (2013.01); *F02C 3/05* (2013.01); *F02C 3/10* (2013.01);
(Continued)

(58) Field of Classification Search
CPC ..................................................... F02C 3/00
USPC ........................................... 290/52; 60/39.15
See application file for complete search history.

(56) References Cited

U.S. PATENT DOCUMENTS 3,659,417 A * 5/1972 Grieb ................. F02C 6/08
454/73
3,731,483 A * 5/1973 Hill ..................... F02C 7/36
60/39.163
(Continued)

FOREIGN PATENT DOCUMENTS

CN  1849444 A  10/2006
CN  101201017 A  6/2008
(Continued)

OTHER PUBLICATIONS

Italian Search Report and Written Opinion dated Oct. 3, 2013 which was issued in connection with Italian Patent Application No. FI2012A000292 which was filed on Dec. 24, 2012.
(Continued)

*Primary Examiner* — Joseph Waks
(74) *Attorney, Agent, or Firm* — GE Global Patent Operation (57) ABSTRACT

A drive system for driving a load by a gas turbine. The gas turbine comprises a gas generator having a gas-generator rotor and comprising at least one gas-generator compressor and one high-pressure turbine driving the gas-generator compressor. The gas turbine further comprises a power turbine having a power-turbine rotor, which is torsionally independent of the gas-generator rotor. The load is connected to the power-turbine rotor. The system further comprises an electric motor/generator mechanically connected to the gas-generator rotor and electrically connected to an electric power grid. The electric motor/generator is adapted to function alternatively: as a generator for converting mechanical power from the gas turbine into electrical power; and as a motor for supplementing driving power to the load. A set of movable nozzle guide vanes is arranged at the inlet of the power turbine.

22 Claims, 3 Drawing Sheets

(51) Int. Cl.

| | | |
|---|---|---|
| *F02C 3/05* | (2006.01) | |
| *F02C 7/275* | (2006.01) | |
| *F02C 9/20* | (2006.01) | |
| *F02C 9/28* | (2006.01) | |
| *F01D 15/10* | (2006.01) | |
| *F02C 3/10* | (2006.01) | |
| *F01D 15/00* | (2006.01) | |
| *F02C 7/268* | (2006.01) | |

(52) U.S. Cl.
CPC ............... *F02C 7/275* (2013.01); *F02C 9/20* (2013.01); *F02C 9/28* (2013.01); *F01D 15/005* (2013.01); *F02C 7/268* (2013.01); *F05D 2220/76* (2013.01); *F05D 2260/4023* (2013.01)

(56) References Cited

U.S. PATENT DOCUMENTS

| | | | |
|---|---|---|---|
| 4,266,401 A | | 5/1981 | Sumegi et al. |
| 4,638,173 A | * | 1/1987 | Milton .................... F01D 15/10 290/52 |
| 6,199,366 B1 | * | 3/2001 | Murata .................... F02C 3/22 60/734 |
| 6,931,856 B2 | | 8/2005 | Belokon et al. |
| 7,526,926 B2 | | 5/2009 | Rasmussen et al. |
| 7,622,817 B2 | | 11/2009 | El-Refaie et al. |
| 2005/0086939 A1 | | 4/2005 | Schmid |
| 2006/0150633 A1 | | 7/2006 | McGinley et al. |
| 2010/0005808 A1 | * | 1/2010 | Nanataki .................. F02C 9/20 60/773 |
| 2010/0058731 A1 | | 3/2010 | Haehner et al. |
| 2010/0180604 A1 | * | 7/2010 | Kawai ...................... F23N 5/184 60/778 |
| 2013/0118146 A1 | * | 5/2013 | Nanataki .................. F02C 9/00 60/39.182 |
| 2015/0285089 A1 | * | 10/2015 | Scarponi ................. F01D 15/08 60/772 |
| 2016/0105078 A1 | * | 4/2016 | Santini .................... F02C 7/36 290/52 |

FOREIGN PATENT DOCUMENTS

| | | |
|---|---|---|
| DE | 1933792 A1 | 1/1971 |
| EP | 1712761 A2 | 10/2006 |
| GB | 2141785 A | 1/1985 |

OTHER PUBLICATIONS

International Search Report and Written Opinion dated Jan. 4, 2014 which was issued in connection with PCT Patent Application No. PCT/EP13/077261 which was filed on Dec. 18, 2013.

Unofficial English Translation of Chinese Office Action issued in connection with corresponding CN Application No. 201380067882.7 on Feb. 29, 2016.

* cited by examiner

Fig.1
STATE OF THE ART

Fig.2

GAS TURBINES IN MECHANICAL DRIVE APPLICATIONS AND OPERATING METHODS

BACKGROUND

The subject matter disclosed herein concerns improvements to gas turbine systems used in mechanical drive applications. In particular, but not exclusively the disclosure concerns gas turbine systems for driving compressors, e.g. compressors for refrigerant fluids in liquefied natural gas facilities.

The disclosure further concerns improvements in methods for operating a system comprising a gas turbine and a load, e.g. a compressor for LNG, or for oil and gas applications, a pump or other rotary equipment.

Liquefied Natural Gas (LNG) results from a liquefaction process, in which the natural gas is cooled using one or more refrigeration cycles in a cascade arrangement, until it becomes liquid. Natural gas is often liquefied for storage or transportation purposes, e.g. if pipeline transportation is not possible or economically unfeasible.

Cooling of the natural gas is performed using closed or opened refrigeration cycles. A refrigerant is processed in a compressor or compressors, condensed and expanded. The expanded, chilled refrigerant is used to remove heat from the natural gas flowing in a heat exchanger.

Refrigerant compressors in LNG, compressors for pipeline applications or other rotary equipment for applications in the oil and gas industry, are often driven by gas turbines. The gas turbine power availability (i.e. the power available on the turbine power shaft) is dependent upon ambient conditions, e.g. air temperature, and other factors, such as ageing. The turbine power availability increases with decreasing temperatures and, conversely, decreases with increasing temperatures. This causes power availability fluctuations both in the 24 hours as well as during the year, due to daily and seasonal temperature fluctuations.

It has been suggested to provide an electric motor in combination with a gas turbine to drive a load, comprised of e.g. one or more compressors. The electric motor is operated to supplement mechanical power to the load, to maintain the overall mechanical power on the load shaft constant, when power availability of the turbine decreases and/or to increase the total mechanical power used to drive the load. This function of the electric motor is referred to as helper duty. The same electric motor is usually used also as a starter motor, to accelerate the string formed by the gas turbine and the load from zero to the rated speed.

When an excess mechanical power is generated by the turbine, e.g. if the ambient temperature drops below the design temperature and consequent increase in power availability of the turbine, the excessive mechanical power generated by the gas turbine is converted into electric power, using the electric helper motor as a generator.

Figure 1:
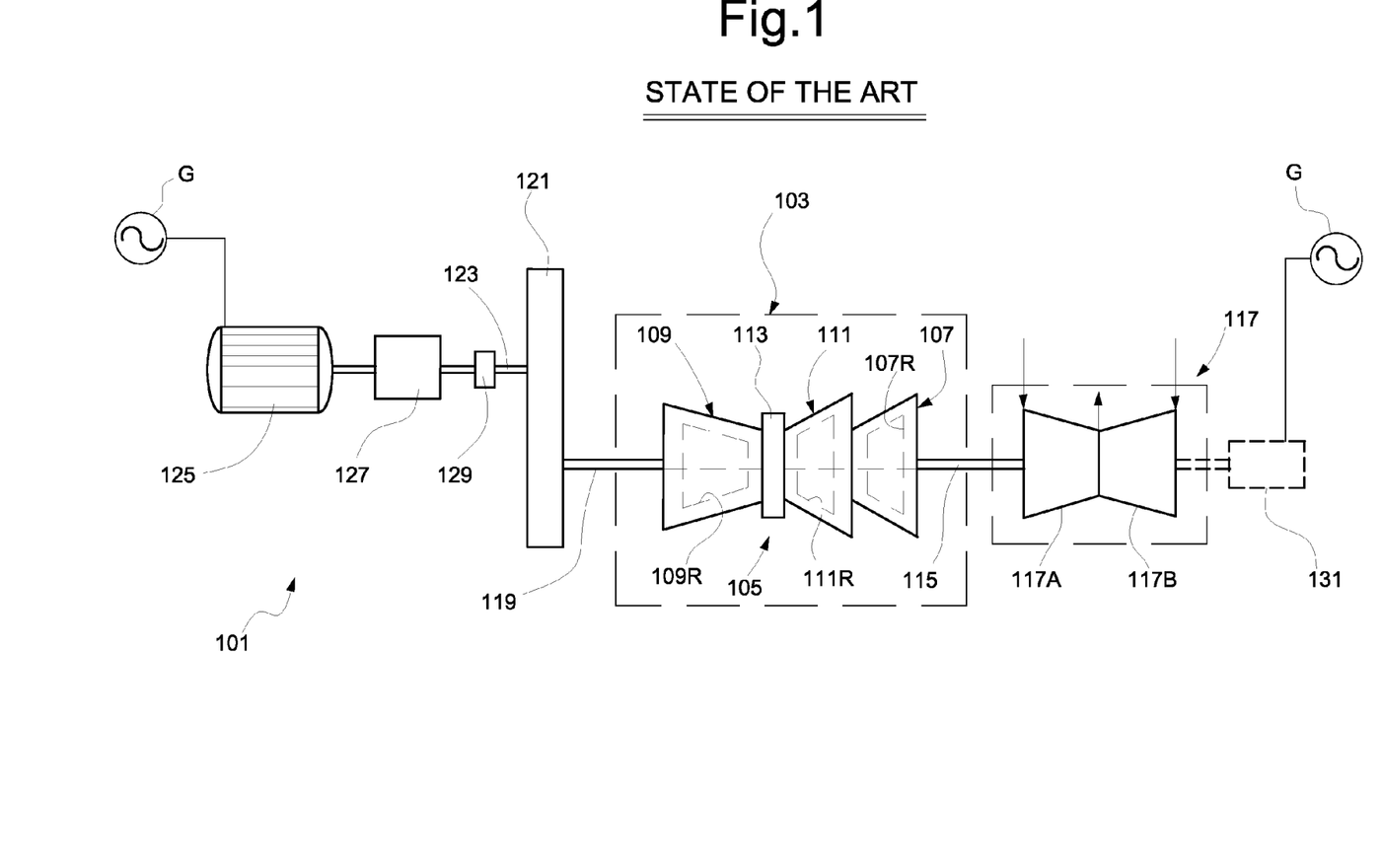
FIG. 1 illustrates a gas turbine arrangement according to the background art.

FIG. 1 schematically illustrates a system comprising a gas turbine arranged for mechanical drive applications, i.e. for driving a load different from an electric generator, in particular for driving a compressor or compressor train. The system 101 comprises a gas turbine 103. The gas turbine is in turn comprised of a gas generator 105 and a power turbine 107. The gas generator 105 is comprised of a compressor 109 and a high-pressure turbine 111. The gas generator 105 comprises a gas generator rotor including the rotor 109R of the compressor 109 and the rotor 111R of the high-pressure turbine 111. The rotor 109R of the compressor 109 and the rotor 111R of the high-pressure turbine 111 are mounted on a common shaft and together form a gas generator rotor.

The compressor 109 compresses ambient air, which is delivered to a combustion chamber or combustor 113, where the compressed air is mixed with a liquid or gaseous fuel and the fuel/air mixture is ignited to generate combustion gas. The high-temperature and high-pressure combustion gas is partly expanded in the high-pressure turbine 111. Mechanical power generated by the gas expansion in the high-pressure turbine 111 is used to drive the compressor 109.

Hot and partly expanded gas exiting the high-pressure turbine 111 flows through the power turbine or low-pressure turbine 107. The combustion gas expands in the power turbine 107 to generate mechanical power made available on a load coupling shaft 115. The power available on the load coupling shaft 115 is used to drive into rotation a load globally labeled 117. The load 117 can comprise a compressor or a compressor train, for example. In the embodiment of FIG. 1 the load 117 comprises a double compressor 117A, 117B.

The rotor of the power turbine 107 is mechanically separated from, i.e. not torsionally coupled to, the gas generator rotor formed by the compressor rotor 109R and the high-pressure turbine rotor 111R.

The gas generator rotor is connected through a shaft 119 to an auxiliary reduction gear 121. The auxiliary reduction gear 121 has an input shaft 123 which is mechanically connected to an electric motor 125 operating as a starter. A torque converter 127 and optionally a clutch 129 are arranged between the starter 125 and the input shaft 123 of the auxiliary reduction gear 121.

The starter 125 is connected to an electric power distribution grid schematically shown at G.

The electric motor or starter 125 is used to start the gas turbine 103. Starting is performed by energizing the electric motor 125 and by driving into rotation at gradually increasing rotary speed the gas generator rotor through the torque converter 127. Once sufficient air flows through the compressor 109, the gas generator can be ignited by delivering fuel to the combustor 113. The combustion gases are conveyed through the power turbine 107 and the gas turbine 103 starts rotating the load 117. The torque converter 127 allows gradual acceleration of the gas turbine 103 while the electric motor 125 rotates at constant speed according to the grid frequency.

Reference number 131 indicates an electric motor, operating as a helper and arranged at the end of the string comprising the gas turbine 103 and the load 117, opposite the electric motor 125. The helper 131 converts electric power into mechanical power to drive the load 117 in combination with the gas turbine 103, for example when the power available from the gas turbine 103 drops, for instance due to increasing environment temperature.

The system 101 is complex and has a large footprint.

SUMMARY OF THE INVENTION

The subject matter disclosed herein provides for a hybrid system, wherein a dual-shaft gas turbine is combined with a reversible electric machine that can be switched in a motor-mode or in a generator mode. When switched in the motor mode, the reversible electric machine can provide for a helper duty or starter duty, depending upon the operative conditions of the gas turbine system. When switched in the generator mode, the reversible electric machine can convert available mechanical power, produced by burning a fuel mixed into a flow of compressed air, into electric power. The electric power can be delivered to an electric power distribution grid. In some embodiments or under some conditions, e.g. in case of loss or lack of an electric power distribution grid, the generator can supply electric power for the facilities and ancillary devices of the system comprising the gas turbine and the load driven thereby.

The gas turbine can comprise a gas generator with a gas-generator compressor, a combustor and a high-pressure turbine. Combustion gases from the combustor are delivered through the high-pressure turbine to produce mechanical power, which is used to drive the gas-generator compressor. Air ingested and compressed by the gas-generator compressor is delivered to the combustor, mixed with a fuel flow and ignited to generate the combustion gas flow. The partly expanded combustion gas flow is further expanded in the power turbine, to drive the load. The power turbine has a power rotor mounted for rotation on a power turbine shaft, which is mechanically independent of the gas-generator rotor. The reversible electric machine, i.e. the electric motor/generator is mechanically constrained or connectable to the gas-generator rotor, while the load is mechanically constrained via a load coupling or the like to the power-turbine shaft. When the electric motor/generator operates as a motor, i.e. provides for a helper duty, power from the electric motor/generator is thermodynamically transferred to the power turbine, as will be explained in more detail here below, reference being made to some embodiments of the subject matter disclosed herein. Conversely, if the electric motor/generator is switched to the generator mode, a reduction of power transfer from the high-pressure turbine to the power turbine is again obtained thermodynamically.

According to some embodiments, a drive system for driving a load is thus provided, comprising a gas turbine comprised of: a gas generator having a gas-generator rotor and comprising at least one gas-generator compressor and one high-pressure turbine driving the gas-generator compressor; and a power turbine having a power-turbine rotor, which is torsionally independent of said gas-generator rotor. Torsionally independent means that the power-turbine rotor and the gas-generator rotor can rotate at different rotary speeds and are constructed and arranged a mechanically separate members, power from the gas generator to the power turbine being transferred thermodynamically, through the combustion gas flow. The drive system further comprises a load coupling connecting the power-turbine rotor to the load and an electric motor/generator mechanically connected to the gas-generator rotor and electrically connected to an electric power grid. The electric motor/generator is adapted to function alternatively: as a generator for converting mechanical power from said gas turbine into electrical power; and as a motor for supplementing driving power to the load, i.e. as a helper.

In some embodiments the electric motor/generator can be operated in the motor mode to start the gas turbine. A separate starter can thus be dispensed with.

A frequency converter can be provided between the electric motor/generator and the electric power grid. The frequency converter enables the electric motor/generator to rotate at a speed which is independent of the electric power frequency. A variable operative frequency is used e.g. to gradually accelerate the gas turbine at start-up, so that a torque converter is not required. The frequency converter is further used for conditioning electric power generated by the electric motor/generator when the latter operates in the generator mode and generates electric energy at a frequency different from the grid frequency.

The gas turbine can be provided with a flow-conditioning arrangement, arranged and controlled to modify an air or combustion-gas flow through the gas turbine. A flow-conditioning arrangement is one which is capable of modifying the flow of a gaseous stream through the gas turbine, e.g. by modifying the cross section at the inlet of a turbomachine. In particular the flow-conditioning can comprise movable nozzle guide vanes at the inlet of the power turbine. The movable nozzle guide vanes can be controlled to modify the flow cross-section and thus the pressure conditions between the high-pressure turbine and the power turbine. Acting upon the movable nozzle guide vanes causes modification to the enthalpy drop performed by the combustion gas in the high pressure turbine and thus the enthalpy available at the inlet of the power turbine.

In some further embodiments, the flow-conditioning arrangement can comprise movable inlet guide vanes at the inlet of the gas-generator compressor, for modifying the inflow condition of the air ingested by the gas-generator compressor.

According to a further aspect, the subject matter disclosed herein relates to a method for driving a load with a gas turbine, said method comprising the steps of:

compressing combustion air in a gas-generator compressor having a gas-generator rotor, mixing the combustion air with a fuel, igniting an air/fuel mixture and generating compressed combustion gas;

partially expanding the combustion gas in a high-pressure turbine and generating mechanical power to drive the gas-generator compressor;

further expanding the combustion gas in a power turbine having a power turbine shaft, which is torsionally disconnected from the high-pressure turbine;

driving a load with the power turbine shaft;

mechanically connecting an electric motor/generator to the gas-generator rotor and electrically connecting said electric motor/generator to an electric power grid;

operating the electric motor/generator selectively:

in an a motor mode (i.e. as a helper) to convert electric power into supplemental mechanical power, deliver the supplement mechanical power to the gas-generator rotor, thermodynamically transferring additional power to the power turbine and converting the additional power into mechanical power to drive the load;

in a generator mode to convert mechanical power available from the gas-generator rotor into electric power;

providing a flow-conditioning arrangement comprising set of movable nozzle guide vanes at the inlet of the power turbine for modifying a combustion-gas flow through the power turbine for selectively:

decreasing power transferred from the gas generator to the power turbine and converting mechanical power available from the high-pressure turbine into electric power; or increasing power transferred from the gas generator to the power turbine, when said electric motor/generator operates as a motor and supplements mechanical power to the gas-generator rotor.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 2:
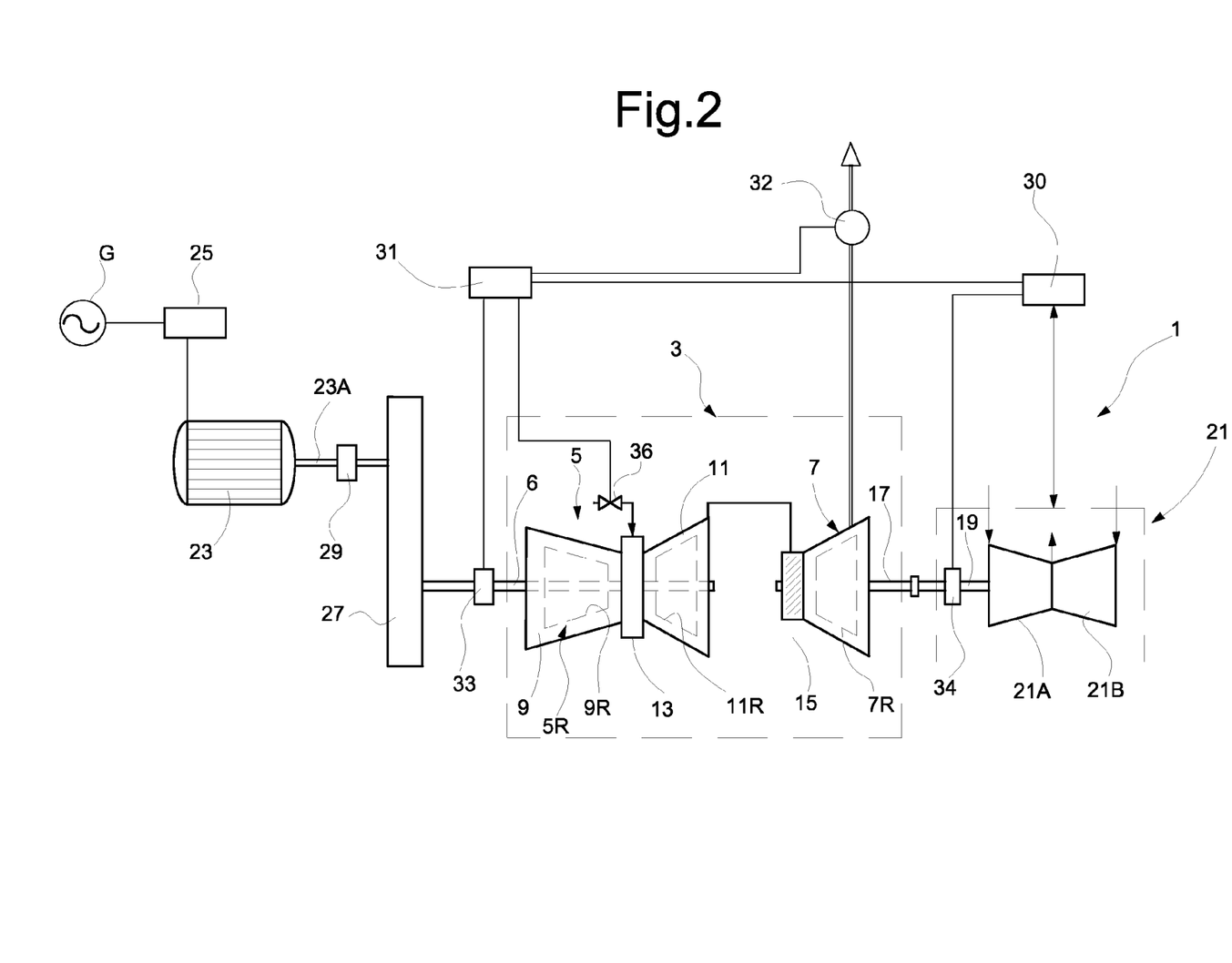
FIGS. 2 and 3 illustrate two gas turbine arrangements according to the present disclosure

FIG. 2 illustrates a first embodiment of the subject matter disclosed herein. A mechanical drive system 1 comprises a gas turbine 3. The gas turbine 3 comprises a gas generator 5 and a power turbine or low-pressure turbine 7. The gas generator 5 can be comprised of a gas-generator compressor 9 and a high-pressure turbine 11. The compressor rotor is schematically shown at 9R and the high-pressure turbine rotor is shown at 11R. The rotors 9R and 11R are mounted on a common shaft 6 and together form a gas generator rotor 5R.

The gas-generator compressor 9 compresses air from the environment, which is delivered to a combustor 13. In the combustor 13 fuel is added to the air flow and a fuel/air mixture is formed and ignited. The combustion gas generated in the combustor is delivered to the high-pressure turbine 11 and partly expands therein, generating mechanical power. The mechanical power generated by the high-pressure turbine 11 is used to drive the gas-generator compressor 9.

The partly expanded combustion gas flows through the power turbine 7, where it further expands to generate additional mechanical power. In the embodiment illustrated in FIG. 2 the power turbine 7 is comprised of movable nozzle guide vanes schematically shown at 15. The movable nozzle guide vanes 15 can be used to modify the flow conditions of the combustion gas entering the power turbine 7. In some embodiments the movable nozzle guide vanes 15 can be used to modify the combustion gas flow section, thus increasing or decreasing the pressure at the outlet of the high-pressure turbine 11. Increasing the gas pressure at the outlet of the high-pressure turbine 11 reduces the enthalpy drop across the high-pressure turbine 11. A higher enthalpy drop is thus available across the power turbine 7, which can produce more mechanical power, which will be available on the turbine output shaft. As will be clarified later on, by regulating the movable nozzle guide vanes 15 the rotary speed of the gas generator rotor 5R can be adjusted and the amount of power available on the output shaft of the power turbine 7 can be modulated. The power turbine 7 is comprised of a power turbine rotor 7R mounted on a power turbine shaft 17, which is torsionally independent of the shaft 6 of the gas generator 5, i.e. the power turbine shaft 17 rotates independently of shaft 6 of the gas generator shaft 5R.

The power turbine shaft 17 is connected, through a load coupling shaft 19, to a load generally shown at 21, which is driven in rotation by the power available on the power turbine shaft 17 and generated by gas expansion in the power turbine 7. In some embodiments the load 21 can include one or more compressors, for example two compressors 21A, 21B as shown by way of example in the embodiment of FIG. 2.

In the embodiment shown in FIG. 2 a direct coupling is provided between the power turbine shaft 17 and the load coupling shaft 19. The load thus rotates at the same rotary speed as the power turbine. One or more joints can be arranged between the power turbine 7 and the load 21, for example one or more flexible joints, to adjust for angular mismatches and/or to compensate for thermal expansion of the coupling. In other embodiments, not shown, a speed manipulation system, such as a gearbox, can be arranged between the power turbine 7 and the load 21, e.g. when the power turbine 7 and the load 21 rotate at different rotary speeds.

In some embodiments the cold end of the gas turbine, i.e. the end opposite the power turbine 7, can be connected to a reversible electric machine, i.e. an electric machine that can operate selectively as an electric generator or an electric motor. The reversible electric machine will be referred to here below as an electric motor/generator 23.

The electric motor/generator 23 can be electrically connected to an electric power distribution grid schematically shown at G. In an embodiment, the electric motor/generator 23 is combined with an electric power conditioning unit, e.g. a variable frequency driver 25. For the purposes which will become clearer later on, the variable frequency driver 25 allows the electric motor/generator 23 to rotate at a speed which is independent of the electric frequency on the grid G, so that the electric motor/generator 23 can be used to start the power turbine 3 and/or to provide supplemental mechanical power to the system 1, e.g. when the power available from the gas turbine 3 drops, allowing the gas turbine to rotate at a speed which is independent of the grid frequency. The same variable frequency driver also allows the electric motor/generator to operate in the generator mode and supply electric power to the grid, rotating the electric motor/generator 23 at a speed different from the grid frequency and independent therefrom.

In a particular case, the drive system 1 could comprise an electric generator 23 having a constant rotary speed. In this case, the electric generator 23 needs to rotate at a substantially constant speed to supply electric power to the grid at the grid frequency. In this configuration a VFD (a variable frequency driver) is not required.

Since it's desirable a substantially constant rotary speed of the electric generator 23, the power supplied at the shaft 6 needs to be correctly regulated.

The movable nozzle guide vanes 15 of the power turbine 7 allow a constant adjustment of the enthalpy drop in the high-pressure turbine 11, regulating consequently the rotary speed of the shaft 6 and the speed of the electric generator 23 that could be maintained substantially constant.

Between the shaft 6 of the gas generator 5 and the electric motor/generator 23 an auxiliary gear box 27 can be provided. The gearbox 27 can be used to drive one or more auxiliary facilities, such as lubrication oil pumps and the like, combined with the gas turbine 3. In other embodiments, the gearbox 27 can be omitted and a direct drive can be provided between the electric motor/generator 23 and the gas generator 5.

In some embodiments a clutch 29 can be interposed between the electric motor/generator 23 and the auxiliary gearbox 27. In other embodiments the clutch 29 can be arranged between the gearbox 27 and the shaft 6 of the gas generator 5. If no gearbox is provided, a clutch 29 can be arranged between the electric motor/generator 23 and the shaft 6 of the gas generator 5.

The operation of the system described so far is as follows. To start the system the electric motor/generator 23 is switched to the motor mode and energized to operate as a starter. Through the variable frequency driver 25 the electric motor/generator 23 is powered with a gradually increasing electric frequency so that rotational speed of the motor/generator 23 can accelerate. The clutch 29 transmits the rotation of the electric motor/generator shaft 23A to the auxiliary gearbox 27 and to the gas generator rotor 5R.

When a sufficient air flow rate at the outlet of the gas-generator compressor 9 has been achieved, the combustor 13 can be ignited and the gas generator 5 starts operating. A flow of hot pressurized combustion gas is formed in the combustor 13 and delivered through the high-pressure turbine 11, which gradually takes over the task of rotating the gas-generator compressor 9, and through the power turbine 7.

The driving of the gas generator 5 is finally entirely taken over by the high-pressure turbine 11 and the power turbine 7 gradually accelerates, driving the load 21 into rotation.

When the gas turbine 1 has reached a steady-state condition, the electric motor/generator 23 can be set in a non-operative condition and can be driven into free rotation (free-wheeling) if no clutch is provided between the electric motor/generator 23 and the gas turbine 3. Alternatively, if a clutch 29 is provided, the electric motor/generator 23 can remain stationary. The gas turbine 3 provides sufficient power for driving the load 21. However, as will become apparent from the following description, in some situations the electric motor/generator 23 can be required to supplement power to the gas turbine. The electric motor/generator will be switched to the motor mode and operate as a helper (so-called helper duty). In some other situations the electric motor/generator 23 can be required to absorb mechanical power available from the gas turbine to generate electric power. The electric motor/generator 23 will then be switched to the generator mode.

More specifically, operating the electric motor/generator 23 as a helper can be required e.g. when the power generated by the power turbine 3 and made available on the power turbine shaft 17 is insufficient to drive the load 21 at the required speed. The electric motor/generator 23 can be operated in the motor mode also in other situations, e.g. in order to save fuel and use electric energy instead. This can be useful for instance at night time, when the cost of the electric energy available from the electric distribution grid G is less than the cost of the fuel.

Vice-versa, the electric motor/generator 23 can be switched to the generator mode e.g. in case of grid loss, i.e. when electric power from the electric power distribution grid G is not available. In this case the electric motor/generator 23 will provide electric energy to power the system and any other facility or auxiliary unit associated therewith.

In some embodiments, the electric motor/generator 23 can be set to operate in the generator mode also if the power available from the gas turbine exceeds the power required to drive the load and e.g. the cost of the electric energy is higher than the cost of the fuel, e.g. during peak hours, so that producing electric energy by means of fossil fuel (liquid or gaseous) and selling the electric energy produced becomes economically advantageous. Under some circumstances the electric motor/generator 23 can be switched to the generator mode also for correcting the power factor.

An electronic gas turbine controller 31 can be provided for controlling the system 1 in the various different modes of operation.

Several factors can modify the operating conditions of the system 1, making surplus power from the gas turbine 3 available or requiring supplemental power for driving the load 21. For example, if the load 21 comprises one or more compressors, the gas flow through the compressors can fluctuate, thus provoking a fluctuation in the power required for driving the load.

Environment conditions, in particular environment temperature can modify the operating conditions of the gas turbine 3. Increasing environment temperature reduces the power available on the power turbine shaft 17 of the power turbine 7. A drop in the ambient temperature, vice versa, causes an increase in the available of the output of the gas turbine 3.

When the electric motor/generator operates in the generator mode, the variable frequency driver 25 allows the electric motor/generator 23 to rotate at a frequency which is non-synchronous with the frequency of the electric power distribution grid G. The electric power generated by the generator 23 will then be conditioned by the variable frequency driver 25 so that the electric power delivered to the electric power distribution grid G will be identical with the grid frequency. When the electric motor/generator 23 operates in the motor mode, the variable frequency driver 25 allows the motor to rotate at the required speed, corresponding to the rotation speed of the gas generator rotor R, said speed being independent of the electric frequency of the electric power distribution grid G. The rotary speed of the gas generator thus becomes independent of the grid frequency.

For a better understanding of the operation of the system described so far, different examples of operating conditions will now be described.

The system is usually controlled based on a signal provided by a load controller 30. The load controller 30 generates a control signal, which is delivered to the gas turbine controller 31. In some embodiments the load controller 30 provides a speed signal, i.e. a signal corresponding to the rotary speed, at which the load 21 is required to rotate. The speed signal can be expressed in terms of percentage of the rated speed of the power turbine shaft 17. Starting from a steady state condition, with the power turbine 7 running at e.g. 95% of its rated speed, if a higher flow rate through the compressors 21A, 21B is required, the load controller 30 will deliver to the turbine controller 31 a signal requiring acceleration of the power turbine shaft 17, e.g. at 100% of the rated rotary speed of the power turbine 7. The gas turbine controller 31 will increase the fuel flow rate, until the requested rotary speed has been achieved. The additional fuel flow rate generates more power, which is used to process a higher fluid flow rate in the compressor 21.

Even though the requested rotary speed is within the range that can be achieved by the gas turbine (which can operate e.g. between 50% and 105% of the rated rotary speed), in some operating conditions the power available at power turbine shaft 17 can be insufficient to achieve the required rotary speed. For instance, if the environment temperature is higher than the design temperature value, the turbine will not be able to achieve the maximum design power.

The maximum power available on the power turbine shaft 17 is achieved when the exhaust gas temperature, i.e. the temperature at the power turbine output, achieves a maximum temperature set point. In some embodiments, the gas turbine controller 31 can be interfaced with an exhaust gas temperature sensor 32. If the maximum exhaust gas temperature is achieved and the requested rotary speed (e.g. 100% of the rated speed in the present example) has not been achieved, the gas turbine controller 31 determines that the power available from the gas turbine 3 is insufficient to drive the load at the rotary speed required by the load controller 30. The electric motor/generator 23 must be switched in the motor mode and provide supplemental power to drive the load. This can be performed automatically, i.e. under the sole control of the gas turbine controller 31. In other embodiments the gas turbine controller 31 can trigger a request to start the electric motor/generator 23, and an operator will enable the electric motor/generator 23 operate as a helper.

Once the electric motor/generator 23 has started, it will convert electric power into mechanical power available on the shaft 6 of the gas generator rotor 5R. The resistive torque on the gas generator rotor shaft 6 will thus drop and the speed of the gas generator rotor 5R increases. A speed sensor 33 can provide a speed signal to the gas turbine controller 31. When the speed of the gas generator rotor 5R increases, the gas turbine controller 31 will act upon the movable nozzle guide vanes 15 reducing the cross sectional area through which the gas is flowing, thus increasing the pressure at the output of the high-pressure turbine 11 and consequently at the inlet of the power turbine 7. The enthalpy drop across the high-pressure turbine decreases, while the enthalpy drop across the power turbine 7 increases, making more mechanical power available on the power turbine shaft 17. The increased enthalpy available at the inlet of the power turbine 7 accelerates the power turbine shaft 17 and the load 21 until the required rotary speed is achieved and maintained.

The electric motor/generator 23 operating in the helper mode provides therefore additional mechanical power to drive the gas-generator compressor 9, so that more power from the combustion gas is available and can be transferred from the high-pressure turbine 11 to the power turbine 7 and made available for driving the load 21.

A further situation where the set load speed cannot be achieved can be due to low fuel availability. In this case the motor/generator 23 is again operated in the helper mode, to provide supplemental mechanical power to the high pressure turbine shaft 6, thus increasing the enthalpy drop available across the power turbine 7. Power from the combustion gas is transferred from the high-pressure turbine to the power turbine, and made available for driving the load.

Whenever the motor/generator 23 is operated in the motor mode to supply mechanical power to the gas turbine, the reduction of resistive torque on the gas generator rotor 5R shifts the available enthalpy drop from the high pressure turbine 11 to the power turbine 7.

As described above, in some conditions the helper mode can be triggered when the requested rotary speed cannot be achieved using only the power available from the gas turbine, i.e. when the fuel delivery reached the maximum value without achieving the requested rotary speed of the power turbine. However, in some circumstances the system 1 can be controlled so that part of the power required to drive the load 21 is delivered by the electric motor/generator operating in the helper mode, limiting the fuel flow rate, in order to save fuel even if the gas turbine would be capable of providing sufficient power to drive the load by itself. This can be done, e.g. when the cost per electric energy unit is lower than the cost of the equivalent amount of fuel, e.g. at night time. It can be economically advantageous to drive the load 21 in a hybrid mode, combining electric power from the electric motor/generator 23 running in the helper mode, with mechanical power generated by the gas turbine, the turbine being operated at less than its maximum power rate, with a reduced amount of fuel delivered thereto. The mode of operating the system would be the same as described above, but the electric motor/generator would be put into operation in the helper mode (motor mode) before the combustion gas temperature at the stack achieves the maximum set point value.

When the drive system 1 comprises an electric motor 23, the set of movable nozzle guide vanes 15 allow to avoid dangerous over speed of the gas turbine 3. In particular, if the rotary speed of the high-pressure turbine 11 is near to the maximum operative speed and the power turbine 7 needs additional power, the intervention of the electric motor 23 risks to pass the physical limits of the machine, creating damages on the gas turbine.

To avoid an over speed of the high-pressure turbine 11, it's possible to move the movable nozzle guide vanes 15 in order to regulate the power transferred to the power turbine 7. Closing the movable nozzle guide vanes 15 the power is transferred form the high-pressure turbine 11 to the power turbine 7. In this way, the power supplied to the drive system 1 by the electric motor 23 doesn't overload the shaft of the high-pressure turbine 11 but it's transferred to the power turbine 7. If the power available from the gas turbine exceeds the power required to drive the load 21, the electric motor/generator 23 can be switched to the generator mode and driven into rotation exploiting part of the available mechanical power from the gas turbine to produce electric power. Whether the electric motor/generator is switched to the generator mode to convert part of the available mechanical power from the gas turbine into electric power or whether the output turbine power is simply reduced by reducing the fuel flow rate depends e.g. upon the actual economic convenience of exploiting fuel to generate electric power, or whether the electric power distribution grid is unavailable. Further considerations shall be given to the effect of the load reduction on the gas turbine efficiency and on the potential negative effect of load reduction on the chemical composition of the combustion gas. As known to those skilled in the art, in fact, operating the gas turbine below the design point might result in increased noxious emissions.

To improve operation of the gas turbine and/or to produce useful electric power in case of reduced power request by the load and/or to provide electric power to the plant in case of grid loss, the electric motor/generator 23 can operate in the generator mode to generate the electric power.

Assuming that the electric motor/generator 23 is connected to the electric power distribution grid G and that the power turbine is running at less than the rated maximum power, the temperature of the combustion gas will be below the maximum temperature set point. This situation indicates that the turbine can generate more power than actually needed to drive the load 21. The electric motor/generator 23 is switched in the generator mode and starts operating. The resistive torque on the shaft 6 of the gas generator rotor 5R increases and the rotary speed of the gas generator rotor 5R drops. The speed reduction is detected via rotary speed sensor 33. The gas turbine controller 31 acts upon the movable nozzle guide vanes 15 to counteract the speed drop by opening the nozzle guide vanes 15. This results in the combustion gas performing a larger enthalpy drop in the high pressure turbine 11. Less power will thus be available in the partly expanded combustion gas to drive the power turbine 7. I.e. a different distribution of the total enthalpy drop available is provide, shifting part of the available enthalpy drop from the power turbine 7 to the high-pressure turbine 11, thus overcoming the increased resistive torque on the shaft 6 of the gas generator rotor 5R.

Consequently, the rotary speed of the power turbine 7 and of the output shaft 17 will decrease. The rotary speed reduction is detected by the load controller 30 e.g. via a speed sensor 34. The fuel valve 36 is opened to increase the fuel flow rate thus counteracting the reduction of the power turbine rotary speed, maintaining the required load rotary speed or bringing said load rotary speed back at the required value. This process is repeated iteratively, thus increasing at each step the power generated by the electric motor/generator 23 and compensating the drop in the power turbine speed by increasing the fuel flow rate. This process can be repeated until the maximum exhaust temperature is reached, or the maximum capacity of the electric motor/generator 23 is reached, whichever comes first. The system will then be maintained in this operative condition, running the gas turbine 3 at a higher overall power level, converting the excess mechanical power into electric power. More efficient fuel consumption and potentially a reduction of noxious emissions are also obtained, being the gas turbine operated closer to the design point.

In some embodiments, the gas-generator compressor 9 can be provided with movable inlet guide vanes. The latter can be controlled to modulate the inlet cross section based on the environment temperature and/or of the rotary speed of the compressor.

Figure 3:
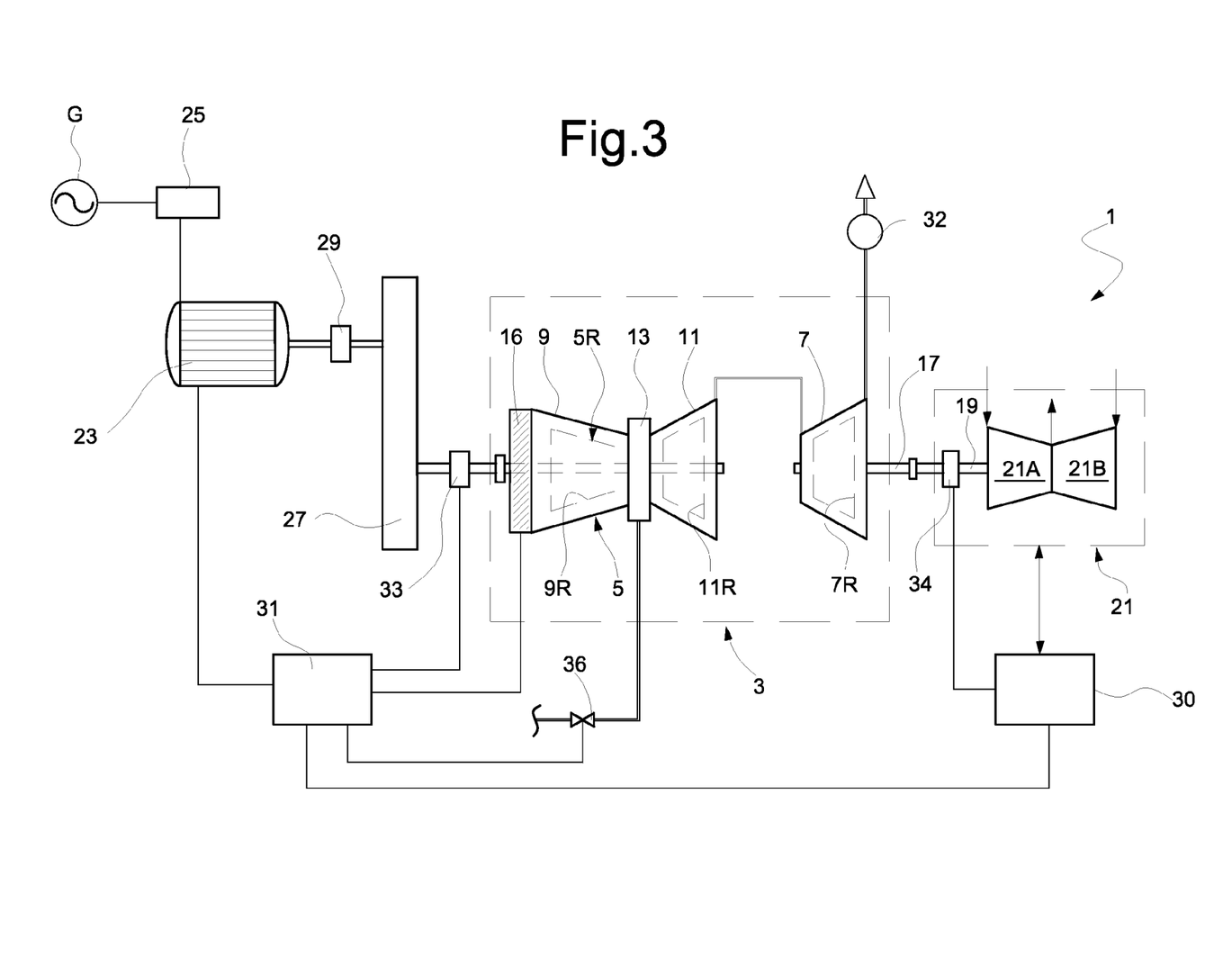

FIG. 3 illustrates a further embodiment of the subject matter disclosed herein. The same or equivalent components, parts or elements as in FIG. 2 are indicated with the same reference numbers. The mechanical drive system 1 of FIG. 3 comprises a gas turbine 3. The gas turbine 3 is in turn comprised of a gas generator 5 and a power turbine or low-pressure turbine 7. In some embodiments, the gas generator 5 can be comprised of a gas-generator compressor 9 and a high-pressure turbine 11. The compressor rotor is schematically shown at 9R and the high-pressure turbine rotor is shown at 11R. The rotors 9R and 11R are mounted on a common shaft 6 and together form a gas generator rotor 5R.

The gas-generator compressor 9 is provided with movable inlet guide vanes schematically shown at 16. The movable inlet guide vanes 16 can be controlled to modify the air inlet flow rate depending upon the operating conditions of the gas turbine and of the load driven thereby, as will be described in greater detail later on. Contrary to the previously described embodiment of FIG. 2, the power turbine 7 is not provided with movable nozzle guide vanes.

The gas turbine 3 of FIG. 3 can e.g. be an aeroderivative gas turbine, such as a PGT25 or a PGT25+, available from GE Oil & Gas, Florence, Italy. In other embodiments, the gas turbine 3 can be a heavy duty gas turbine.

The gas-generator compressor 9 ingests and compresses air from the environment. The compressed air is delivered to a combustor 13 and mixed with fuel. The fuel/air mixture formed in the combustor is ignited, to generate a flow of combustion gas, which is delivered to the high-pressure turbine 11 and partly expands therein, generating mechanical power. The mechanical power generated by the high-pressure turbine 11 is used to drive the gas-generator compressor 9.

The partly expanded combustion gas from the high-pressure turbine 11 flows through the power turbine 7, where it further expands and generates additional mechanical power to drive a load.

The power turbine 7 is comprised of a power turbine rotor 7R mounted on a power turbine shaft 17, which is torsionally independent of the shaft 6 of the gas generator 5, i.e. the power turbine shaft 17 rotates independently of shaft 6 of the gas generator shaft 5R.

The power turbine shaft 17 is connected, through a load coupling shaft 19, to a load generally shown at 21, which is driven in rotation by the power available on the power turbine shaft 17 and generated by gas expansion in the power turbine 7. One or more joints, clutches or speed manipulating devices (not shown) can be arranged between the power turbine 7 and the load 21. In some embodiments the load 21 can include one or more compressors, for example two compressors 21A, 21B as shown by way of example in the embodiment of FIG. 3.

The cold end of the gas turbine can be connected to an electric motor/generator 23. The latter can be electrically connected to an electric power distribution grid schematically shown at G. The electric motor/generator 23 can be combined with an electric power conditioning unit, e.g. a variable frequency driver 25. The electric power conditioning unit 25 allows the electric motor/generator 23 to rotate at a speed which is independent of the electric frequency on the grid G for the reasons mentioned above in connection with the embodiment of FIG. 2.

Between the shaft 6 of the gas generator 5 and the electric motor/generator 23 an auxiliary gear box 27 can be provided. In other embodiments, the gearbox 27 can be omitted and a direct drive can be provided between the electric motor/generator 23 and the gas generator 5. In some embodiments a clutch 29 can be interposed between the electric motor/generator 23 and the shaft 6 of the gas generator 5.

Start-up of the gas turbine 3 can be performed as already described with respect to the embodiment of FIG. 2, using the electric motor/generator as a starter.

During operation of the system 1, under some conditions, the electric motor/generator 23 can operate as a helper. The electric motor/generator 23 will in this case be switched to the motor mode to convert electric power into mechanical power and supplement mechanical power to the gas turbine 3. Operating the electric motor/generator 23 in the motor mode can be required e.g. when the power generated by the power turbine 3 and made available on the power turbine shaft 17 is insufficient to drive the load 21 at the required speed. Similarly to what has been described in connection with the embodiment of FIG. 2, the electric motor/generator 23 can be operated in the motor mode also in other situations, e.g. in order to save fuel and use electric energy instead.

Vice-versa, the electric motor/generator 23 can be switched to the generator mode e.g. in case of grid loss, i.e. when electric power from the electric power distribution grid G is not available. In this case the electric motor/generator 23 will provide electric energy to power the system and any other facility or auxiliary unit associated therewith. The electric motor/generator can be operated in the generator mode also in other circumstances, e.g. to correct the power factor of the system, or else to increase the total load on the gas turbine, thus reducing noxious emissions and improving the efficiency of the gas turbine, in situations where the load 21 requires reduced power.

For a better understanding of the flexibility of the drive system 1 to cope with various possible operating conditions and for a clearer understanding of the manner of controlling the system, reference will be made here below to some typical situations, which can occur during operation.

The system is usually controlled based on a signal provided by a load controller 30. The load controller 30 generates a control signal, which is delivered to a gas turbine controller 31. In some embodiments the load controller 30 provides a speed signal, i.e. a signal which is a function of the required load rotary speed. As already mentioned in connection with the embodiment of FIG. 2, the speed signal can be expressed in terms of percentage of the rated speed of the power turbine shaft 17. Starting from a steady state condition, with the power turbine 7 running at e.g. 95% of its rated speed, if a higher flow rate through the compressors 21A, 21B is required, the load controller 30 will deliver to the turbine controller 31 a signal requiring acceleration of the power turbine shaft 17, e.g. at 100% of the rated rotary speed of the power turbine 7. A gas turbine controller 31 will increase the fuel flow rate, until the requested rotary speed has been achieved.

As noted above with respect to the embodiment of FIG. 2, in some operating conditions the power available at power turbine shaft 17 can be insufficient to achieve the required rotary speed. For instance, if the environment temperature is higher than the design temperature value, the turbine will not be able to achieve the maximum design power. As noted above, the maximum power on the power turbine shaft 17 is achieved when the exhaust gas temperature reaches a maximum temperature set point, which can be detected by an exhaust gas temperature sensor, not shown in FIG. 3, similar to sensor 32 of FIG. 2. If the maximum exhaust gas temperature is achieved and the requested rotary speed has not been achieved, the gas turbine controller 31 determines that the power available from the gas turbine 3 is insufficient to drive the load 21. The electric motor/generator 23 is thus switched in the motor mode and provides supplemental power to drive the load 21.

Once the electric motor/generator 23 has started, it will convert electric power into mechanical power available on the shaft 6 of the gas generator rotor 5R. The resistive torque on the gas generator rotor shaft 6 will drop and the speed of the gas generator rotor 5R will increase. A speed sensor 33 can provide a speed signal to the gas turbine controller 31. When the speed of the gas generator rotor 5R increases, the gas turbine controller 31 will act upon the movable inlet vane guides 16, increasing the cross section of the inlet guide vanes. Opening of the inlet guide vanes will cause the air flow rate through the gas-generator compressor 9 and thus the combustion gas flow rate through the power turbine 7 to increase. This will make higher mechanical power available on the turbine shaft 17 for driving the load 21, thus increasing the rotary speed thereof.

As a matter of fact, the increased air flow rate ingested by the gas-generator compressor 9 will drop the combustion gas temperature and thus the turbine controller 31 will increase the fuel flow rate, until the temperature set-point is reached again. The higher enthalpy and higher combustion gas flow rate at the inlet of the power turbine 7 will generate more mechanical power on the power shaft 17. At the same time, the higher air flow rate through the gas-generator compressor 9 will cause a reduction of the rotary speed of the gas generator rotor, since more power is required to process the increased air flow rate.

The supplemental power provided by the electric motor/generator 23 operating in the helper mode is thus transferred thermodynamically to the turbine shaft 17 and made available for load driving purposes.

A further situation where the set load speed cannot be achieved can be due to low fuel availability. In this case the motor/generator 23 is again operated in the helper mode, to provide supplemental mechanical power to the high pressure turbine shaft 6. The inlet guide vanes 16 are opened to increase the air flow rate and, similarly to the previously described situation, additional power from the combustion gas is transferred from the high-pressure turbine to the power turbine, and made available for driving the load 21.

As mentioned above, in some circumstances the system 1 can be controlled so that part of the power required to drive the load 21 is delivered by the electric motor/generator 23 operating in the helper mode, limiting the fuel flow rate, in order to save fuel even if the gas turbine would be capable of providing sufficient power to drive the load by itself. This can be done, e.g. when the cost per electric energy unit is lower than the cost of the equivalent amount of fuel, e.g. at night time. The electric motor/generator 23 is in this case put into operation in the helper mode (motor mode) before the combustion gas temperature at the stack achieves the maximum set point value.

If the power available from the gas turbine exceeds the power required to drive the load 21, the electric motor/generator 23 can be switched to the generator mode and driven into rotation exploiting part of the available mechanical power from the gas turbine to produce electric power.

Assuming that the electric motor/generator 23 is connected to the electric power distribution grid G and that the power turbine 7 is running at less than the rated maximum power, the temperature of the combustion gas will be below the maximum temperature set point. This situation indicates that the turbine can generate more power than the one actually used to drive the load 21. The electric motor/generator 23 is switched in the generator mode and starts operating. The resistive torque on the shaft 6 of the gas generator rotor 5R increases and the rotary speed of the gas generator rotor 5R drops. The air flow ingested by the gas-generator compressor 9 is thus reduced and this results in a reduction of the combustion gas flow rate through the power turbine 7. Less power will thus be available to drive the power turbine 7.

Consequently, the rotary speed of the power turbine 7 and of the output shaft 17 will decrease. The rotary speed drop is detected by the controller 30 e.g. via a speed sensor 34. The fuel valve 36 is opened to increase the fuel flow rate thus counteracting the reduction of the power turbine rotary speed, maintaining or bringing back the load rotary speed at the required value. This process is repeated iteratively, thus increasing at each step the power generated by the electric motor/generator 23 and compensating the drop in the power turbine speed by increasing the fuel flow rate. This process can be repeated until the maximum exhaust temperature (e.g. detected by sensor 32) is reached, or the maximum capacity of the electric motor/generator 23 is reached, whichever comes first. The system will then be maintained in the operative condition thus achieved, running the gas turbine 3 at a higher overall power level. The excess mechanical power is converted into electric power. More efficient fuel consumption and potentially better noxious emissions (reduction of noxious emissions) are also obtained, being the gas turbine operated closer to the design point.

In the previously described embodiments a load controller and a gas turbine controller interfaced with respective sensors and actuators have been described. It shall be understood that in some embodiments control can be performed by a single control device, connected to the various sensors and actuators. What matters is that the above described operating parameters can be detected and the required devices acted upon by the respective actuators, e.g. to adjust the fuel flow rate and the like.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A drive system for driving a load, comprising:
   a gas turbine comprising:
      a gas generator comprising a gas-generator rotor, at least one gas-generator compressor, and a high-pressure turbine driving the at least one gas-generator compressor; and
      a power turbine comprising a power-turbine rotor, the power-turbine rotor being torsionally independent of the gas-generator rotor;
   a load coupling connecting the power-turbine rotor to the load;
   an electric motor/generator mechanically connected to the gas-generator rotor and electrically connected to an electric power grid, wherein the electric motor/generator is configured to function alternatively:
      as a generator for converting mechanical power from the gas turbine into electrical power, and
      as a motor for supplementing driving power to the load; and
   a flow-conditioning arrangement, arranged and controlled to modify a combustion-gas flow through the gas turbine, wherein the flow-conditioning arrangement comprises a set of movable nozzle guide vanes at the inlet of the power turbine for controlling the speed of the power turbine.

2. The drive system of claim 1, wherein the electric motor/generator provides a starter facility for starting the gas turbine.

3. The drive system of claim 1, wherein the load comprises at least one compressor.

4. The drive system of claim 1, further comprising a mechanical clutch between the electric motor/generator and the gas-generator rotor.

5. The drive system of claim 1, wherein the electric motor/generator is permanently connected to the gas-generator rotor.

6. The drive system of claim 1, further comprising a frequency converter between the electric motor/generator and the electric power grid, the frequency converter being configured and controlled for conditioning the electric frequency from the electric power grid to the electric motor/generator and from the electric motor/generator to the electric power grid.

7. The drive system of claim 1, wherein the flow-conditioning arrangement is configured and controlled so that:
   when the electric motor/generator functions as a motor, supplemental power delivered by the electric motor/generator is thermodynamically transferred from the gas generator to the power turbine, and
   when the electric motor/generator functions as a generator, mechanical power generated by the high-pressure turbine is converted by the electric motor/generator into electric power.

8. The drive system of claim 7, further comprising a fuel control system for controlling a fuel flow rate to the gas generator, wherein the fuel control system is arranged and controlled to adjust the fuel flow rate so as to maintain a required rotary speed of the power-turbine rotor.

9. The drive system of claim 8, wherein the fuel control system is arranged and controlled so that when the electric motor/generator is set in generator mode, a rotary speed reduction of the gas-generator rotor due to increased resistive torque is counteracted by increasing the fuel flow rate.

10. The drive system of claim 8, wherein the fuel control system is configured for increasing the fuel rate when the air flow through the variable inlet guide vanes increases.

11. The drive system of claim 1, wherein the movable nozzle guide vanes are arranged and controlled so that, when the electric motor/generator is set in the generator mode, a rotary speed reduction of the gas-generator rotor due to increased resistive torque caused by the electric motor/generator is counteracted by opening the movable nozzle guide vanes so as to increase an enthalpy drop in the high-pressure turbine.

12. The drive system of claim 1, wherein the movable nozzle guide vanes are arranged and controlled so that when the electric motor/generator is set in the motor mode, a rotary speed increase of the gas-generator rotor due to reduced resistive torque is counteracted by closing the movable nozzle guide vanes so as to reduce enthalpy drop in the high-pressure turbine and increase enthalpy available at the inlet of the power turbine.

13. The drive system of claim 1, wherein the flow-conditioning arrangement further comprises a set of variable inlet guide vanes at the inlet of the gas generator.

14. The drive system of claim 13, wherein the variable inlet guide vanes are arranged and controlled so that when the electric motor/generator is set in the generator mode, a rotary speed reduction of the gas-generator rotor due to increased resistive torque is counteracted by reducing the air flow through the variable inlet guide vanes.

15. The drive system of claim 13, wherein the variable inlet guide vanes are arranged and controlled so that when the electric motor/generator is set in motor mode, a rotary speed increase of the gas-generator rotor due to reduced resistive torque is counteracted by increasing the air flow through the variable inlet guide vanes.

16. A method for driving a load with a gas turbine, the method comprising:
- compressing combustion air in a gas-generator compressor comprising a gas-generator rotor, mixing the combustion air with a fuel, igniting an air/fuel mixture, and generating compressed combustion gas;
- partially expanding the combustion gas in a high-pressure turbine and generating mechanical power to drive the gas-generator compressor;
- further expanding the combustion gas in a power turbine comprising a power turbine shaft, which is torsionally disconnected from the high-pressure turbine;
- driving a load with the power turbine shaft;
- mechanically connecting an electric motor/generator to the gas-generator rotor and electrically connecting the electric motor/generator to an electric power grid;
- operating the electric motor/generator selectively:
  - in a motor mode to convert electric power into supplemental mechanical power, deliver the supplement mechanical power to the gas-generator rotor, thermodynamically transfer additional power to the power turbine, and convert the additional power into mechanical power to drive the load, and
  - in a generator mode to convert mechanical power available from the gas-generator rotor into electric power; and
- providing a flow-conditioning arrangement comprising a set of movable nozzle guide vanes at the inlet of the power turbine for modifying a combustion-gas flow through the power turbine for selectively:
  - decreasing power transferred from the gas generator to the power turbine and converting mechanical power available from the high-pressure turbine into electric power; or
  - increasing power transferred from the gas generator to the power turbine, when the electric motor/generator operates as a motor and supplements mechanical power to the gas-generator rotor.

17. The method of claim 16, further comprising:
- switching the electric motor/generator in a motor mode and converting electric power into supplemental mechanical power, applied to drive the gas-generator rotor; and
- transferring power from the gas generator to the power turbine by closing the movable nozzle guide vanes, thus reducing an enthalpy drop of the combustion gas expanding across the high-pressure turbine and increasing enthalpy available at the inlet of the power turbine.

18. The method of claim 16, further comprising:
- switching the electric motor/generator in a generator mode for converting mechanical power generated by the high-pressure turbine into electric power; and
- opening the movable nozzle guide vanes for increasing an enthalpy drop of the combustion gas expanding across the high-pressure turbine and converting excess mechanical power produced by the high-pressure turbine into electric power in the electric motor/generator.

19. The method of claim 18, further comprising increasing a fuel flow rate to compensate for the mechanical power converted into electric power.

20. The method of claim 16, further comprising providing a set of movable inlet guide vanes at the inlet of the gas-generator rotor.

21. The method of claim 20, further comprising:
- switching the electric motor/generator in a motor mode and converting electric power into supplemental mechanical power, applied to drive the gas-generator rotor; and
- opening the inlet guide vanes thus increasing an air flow rate through the gas-generator compressor and increasing a fuel flow rate, thus transferring supplemental power from the gas generator to the power turbine.

22. The method of claim 20, further comprising:
- switching the electric motor/generator in a generator mode for converting mechanical power generated by the high-pressure turbine into electric power; and
- increasing a fuel flow rate to compensate for mechanical power converted into electric power.

* * * * *